United States Patent Office 3,564,048
Patented Feb. 16, 1971

3,564,048
HYDRAZINO ALICYCLIC ACIDS
Horace Fletcher III, Pottstown, and Harvey E. Alburn, West Chester, Pa., assignors to American Home Products Corporation, New York, N.Y., a corporation of Delaware
No Drawing. Filed June 25, 1968, Ser. No. 739,611
Int. Cl. C07c 109/00
U.S. Cl. 260—514                         3 Claims

ABSTRACT OF THE DISCLOSURE

Alicyclic acids having a hydrazine substituent are prepared by reacting acetyl hydrazine with an alicyclic compound, the cycloalkylidene compound formed being then reacted to add a cyano group and the cyano alicyclic hydrazide formed is then hydrolyzed to produce the desired compound. The compounds have biochemical activity.

---

This invention relates to alicyclic acids having a hydrazino substituent and more specifically to 1-hydrazinoalicycliccarboxylic acids found to possess pharmacological activity and utility.

The compounds of the invention fall within the scope of and may be illustrated by the following structural formula

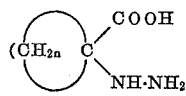

In the above structure, the symbol $n$ represents an integer from 2 to 7, preferably 4 or 5.

The compounds may be prepared by reactions illustrated by the general flow path or reaction sequence shown below.

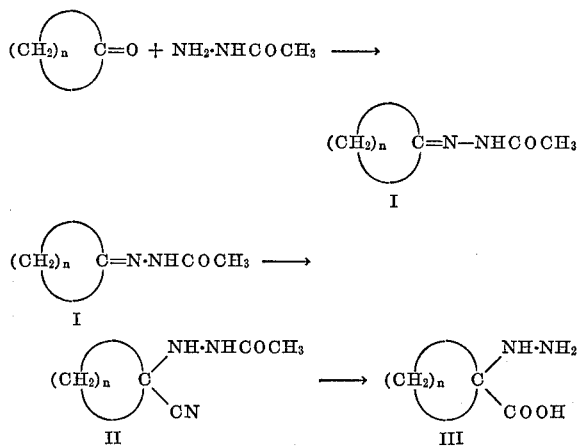

In accordance with the above reaction sequence, an alicyclic ketone is reacted with an acylhydrazide to form an acyl cycloalkylidene hydrazide (I). The acylate reaction product is then treated at ambient temperature with an alkali metal cyanide, and in a mildly acid environment in the neighborhood of pH 6 whereby an acylcyanocycloalkyl hydrazide (II) is formed. Thereafter, the latter compound is reacted under acid hydrolysis conditions and from 0° C. to refluxing temperatures to form the desired hydrazino cycloalkyl carboxylic acid shown as compound III.

The compounds produced by the above described reactions were submitted to pharmacological evaluation tests for activity and utility in the pharmacological and biochemical fields. Included in such tests are procedures designed to show if the compounds have central nervous system activity, specifically stimulant or depressant action or sedative or convulsant activity.

Additionally, compounds may be tested for antitumor activity, antibacterial or antiviral activity. Antitumor activity may be determined in the experimental animal, generally mice, using either solid transplant tumor tissue, exemplified by Sarcoma 180 or Carcinoma 755, or an ascitic type exemplified by Leukemia 1210. The procedure for testing may be the usual standard test which involves implantation of tumor or ascites into the test animal and treating the animal with the test drug from day 1 to death, comparing survival time of treated with control animals.

Antibacterial action may be determined by the well-known agar serial dilution method, and the activity compared with such antibiotic standards as benzylpenicillin, tetracycline or streptomycin. Antiviral activity is determined by standard procedures or methods equivalent thereto, using the standard experimental animal such as mice, rats, guinea pigs, monkeys, and the like. In general, the test consists of inoculating the host with the particular virus selected, and then with the test compound administered at a few dose levels, generally orally. Evaluation for survivors takes place about two to three weeks after administration.

In the pharmacological evaluation tests the compounds of the invention were found to demonstrate central nervous system depressant activity in mice at a dosage range from about 40 to 400 mg./kg. of body weight, generally at about 125 to 400 mg./kg. when given orally or intraperitoneally.

In the antibacterial tests with a standard test organism used, namely, B. subtilis, it was found that compounds of the invention were significantly active in completely inhibiting growth at a minimal inhibitory concentration of 125 µg./ml.

An antitumor test using Leukemia 1210, demonstrated antitumor activity in the range of about 35 to 120 mg./kg. in mice.

Included in the battery of tests to which the compounds were submitted was their evaluation as possible immunosuppressive agents with conceivable utility in human therapy and at least useful in experimental and comparative pharmacology. Such a test will determine if the natural body defenses of warm-blooded animals can be overcome or suppressed to an extent where the body does not reject foreign proteins such as tissue or organ transplants.

The test procedure follows the proposals of Brandriss: Science, 140: 186, 1963 and Levin et al.; Proc. soc. exp. Biol. and Med.; 114: 220, 1963 and determines the ability of the test substance to inhibit induced experimental allergic encephalomyelitis, which is accepted as a model of an autoimmune disease.

In carrying out the test, male rats and guinea pigs are used. Animals are injected intradermally or into the hind paw with an emulsion containing guinea pig spinal cord, killed M. tuberculosis and Freund's adjuvant. The compound being tested is administered at the same time and then 3 to 5 times a week for the duration of the test. The animals are observed and weighed daily. Severe paralysis usually occurs at the 12th to 16th day. The degree of paralysis and possibly eventual death is scored according to a grading system. Control groups run at the same time usual show 60 to 70% paralysis with some mortality. An active compound will prevent paralysis and neural lesions with minimal toxicity.

The above-described test permits the assessment of a compound's ability to inhibit encephalomyelitis in animals as indicated by hind-limb paralysis. Thus, compounds may be compared by this procedure with known compounds demonstrating activity in such a test. Among the known compounds demonstrating significant activity are cortisone, amethopterin, vinblastine, thioguanine, and azathioprine.

It has been found that certain compounds including those named above, demonstrating significant activity against demyelinating diseases which includes the above-induced allergic encephalomyelitis, are also active in suppressing or block the immune response incurred when foreign tissue is introduced or organ transplant is attempted. Theoretical basis for this appears in the published literature, among which may be mentioned one by Rosenthale et al., entitled "Experimental Allergic Encephalomyelitis" (EAE); a test for immuno-suppressing agents: Fed. Proc. 26: 785, 1967.

When compounds of Formula III were submitted to the above-described test procedure, they showed comparable activity with known active compounds in the dosage range of about 10 to 100 mg./kg. of body weight when administered to rats or guinea pigs three times a week for two weeks, without toxic manifestations. These compounds are therefore deemed useful as immuno-suppressive agents in the field of experimental and comparative pharmacology.

The compounds are utilized either in the form described, or may be used in the form of pharmaceutically acceptable acid-addition salts. The latter are prepared by simple reaction of the compounds with an inorganic acid or an organic acid used in sufficient amount to result in the salt formation. Common mineral acids, such as hydrochloric, phosphoric, sulfuric, etc., are contemplated, as are also such organic acids as acetic, maleic, tartaric, fumaric acids.

The compounds may be utilized either orally or parenterally and in the formed mode of administration, may be combined with an inert solid carrier or excipient using the usual diluent or vehicle such as lactose, talc, or nontoxic carbonates. Additionally, in oral or parenteral administration a liquid carrier or vehicle may be used, preferably one that is essentially aqueous.

In order to provide greater detail in preparing the compounds described above, the following examples are given essentially for illustrative purposes.

EXAMPLE 1

Preparation of acetic acid cyclopentylidene hydrazide

Cyclopentanone, 16.8 g. (0.2 mole) and acethydrazide, 15.82 g. (0.2 mole) were stirred in 400 ml. of absolute ethanol for twenty hours and then 250 ml. of solvent were distilled. Benzene, 200 ml., was added and 300 ml. of solvent were distilled and the residue was evaporated in vacuo. The residue was dissolved in 200 ml. of boiling hexane and the product crystallized on chilling.

Yield: 24.0 g., 85%, M.P. 118–120° C.

Calcd. for $C_7H_{12}N_2O$ (percent): C, 59.96; H, 8.63; N, 19.98. Found (percent): C, 59.65; H, 8.40; N, 19.97.

EXAMPLE 2

Preparation of acetic acid cyclohexylidene hydrazide

The title product was prepared as in Example 1, using 19.6 g. cyclohexanone (0.2 mole).

Yield: 21.5 gms., 70%, M.P. 124–5°.

Calcd. for $C_8H_{14}N_2O$ (percent): C, 62.31; H, 9.15; N, 18.17. Found (percent): C, 62.18; H, 8.76; N, 17.88.

EXAMPLE 3

Preparation of acetic acid, 2-(1-cyanocyclopentyl) hydrazide

Acetic acid cyclopentylidenehydrazide, 28 g. (0.2 mole) and potassium dihydrogen phosphate 98 g. (0.7 mole) were stirred in 100 ml. of water and 200 ml. of ether and a solution of potassium cyanide, 24.5 g. (0.38 mole) in 100 ml. of $H_2O$ was added over thirty minutes. The mixture was stirred four days at room temperature, the ether layer was separated and the aqueous phase was extracted with 3× 200 ml. of ether. The ether extracts were combined, dried over anhydrous $Na_2SO_4$, filtered, evaporated and the residue crystallized from ether-hexane.

Yield: 18.9 g., 54%, M.P. 96–98° C.

Calcd. for $C_8H_{13}N_3O$ (percent): C, 57.46; H, 7.84; N, 25.13. Found (percent): C, 57.68; H, 7.76; N, 25.44.

EXAMPLE 4

Preparation of acetic acid, 2-(1-cyanocyclohexyl) hydrazide

The title product was prepared in the same way as described in Example 3 from acetic acid cyclohexylidene-hydrazide 30.8 g. (0.2 mole).

Yield: 27.2 g., 75%, M.P. 101–103° C.

Calcd. for $C_9H_{15}N_3O$ (percent): C, 59.65; H, 8.34; N, 23.19. Found (percent): C, 59.70; H, 8.14; N, 23.23.

EXAMPLE 5

Preparation of 1-hydrazinocyclopentanecarboxylic acid

Acetic acid, 2-(1-cyanocyclopentyl)hydrazide, 15 g., (0.086 mole) was stirred in 96 ml. of aqueous HCl saturated at 0° C. for 24 hours at 0° C., then 48 hours at room temperature and finally refluxed for 6 hours. The solution was then evaporated to dryness in vacuo and the residue was dissolved in absolute ethanol and filtered to remove ammonium chloride. Pyridine 14 ml. (0.174 mole) was added to the filtrate and the product crystallized on chilling.

Yield: 8.6 g., 69%, M.P. 225–228°, dec.

Calcd. for $C_6H_{12}N_2O_2$ (percent): C, 50.07; H, 8.39; N, 19.43. Found (percent): C, 50.43; H, 8.25; N, 19.93.

EXAMPLE 6

Preparation of 1-hydrazinocyclohexanecarboxylic acid

The title compound was prepared as described in Example 5, from acetic acid, 2-(1-cyanocyclohexyl) hydrazide.

Yield: 11.8 g., 68%, M.P. 236–237°, dec.

Calcd. for $C_7H_{14}N_2O_2$ (percent): C, 53.14; H, 8.92; N, 17.71. Found (percent): C, 53.26; H, 8.86; N, 17.63.

The same reaction sequences may be followed but starting with cyclopropanone, cyclobutanone, cycloheptanone, or cyclooctanone. Proceeding as indicated, 1-hydrazinocyclopropane carboxylic acid, 1-hydrazinocyclobutane carboxylic acid, 1-hydrazinocycloheptane carboxylic acid, and 1-hydrazinocyclooctane carboxylic acid would result.

Thus, while the above examples are to be understood as illustrative, the invention is to be considered as embodied within the scope of the appended claims.

The invention that is claimed is:
1. A compound having the structural formula:

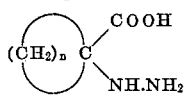

in which the symbol $n$ represents the integer 4 or 5; and the pharmaceutically acceptable acid-addition salts thereof.

2. As a compound of claim 1; 1-hydrazinocyclopentane carboxylic acid.

3. As a compound of claim 1; 1-hydrazinocyclohexane carboxylic acid.

References Cited

March, Advanced Org. Chem. pp. 711, 660, 313 1968.
Greenstein et al., Chemistry of the Amino acids, I, p. 699, 1961.

LORRAINE A. WEINBERGER, Primary Examiner
R. GERSTL, Assistant Examiner

U.S. Cl. X.R.
260—404, 561; 424—319